United States Patent [19]

Satoh et al.

[11] 4,167,787
[45] Sep. 11, 1979

[54] TAPE RECORDER APPARATUS WITH A TAPE-RUNNING DIRECTION DISPLAY

[75] Inventors: Ken Satoh; Norio Fukuoka, both of Hachioji, Japan

[73] Assignee: Olympus Optical Co., Ltd., Tokyo, Japan

[21] Appl. No.: 855,560

[22] Filed: Nov. 29, 1977

[30] Foreign Application Priority Data

Nov. 30, 1976 [JP] Japan .................................. 51-143586

[51] Int. Cl.$^2$ ........................ G06F 15/02; G11B 1/04
[52] U.S. Cl. .................................... 364/705; 360/137
[58] Field of Search .................... 364/565, 705; 360/6, 360/31, 73, 137; 116/114 R, 115; 340/259, 260; 324/160, 161, 172

[56] References Cited

U.S. PATENT DOCUMENTS

| | | | |
|---|---|---|---|
| 3,511,151 | 5/1970 | Hillman | 364/565 X |
| 3,630,170 | 12/1971 | Christo | 116/114 R |
| 3,752,113 | 8/1973 | Blechman | 116/114 R |

FOREIGN PATENT DOCUMENTS

2340373  2/1975  Fed. Rep. of Germany ........... 364/705

*Primary Examiner*—Jerry Smith

[57] ABSTRACT

A tape recorder apparatus comprising a tape drive circuit, an audio circuit, a record-reproduction change-over switch, a fast forward-rewind changeover switch, and a scan converter. The scan converter receives a forward-run signal or a backward-run signal when the record-reproduction change-over switch or the fast forward-rewind changeover switch is operated. Upon receipt of such a signal the scan converter generates a forward scan signal or a backward scan signal. The tape recorder apparatus is further provided with a display device which displays in response to a scan signal from the scan converter a numeral, e.g. 0, shifted sequentially from the lowest digit position to the highest digit position or vice versa. The direction in which 0 is shiftingly displayed is the very direction in which the tape is running.

9 Claims, 7 Drawing Figures

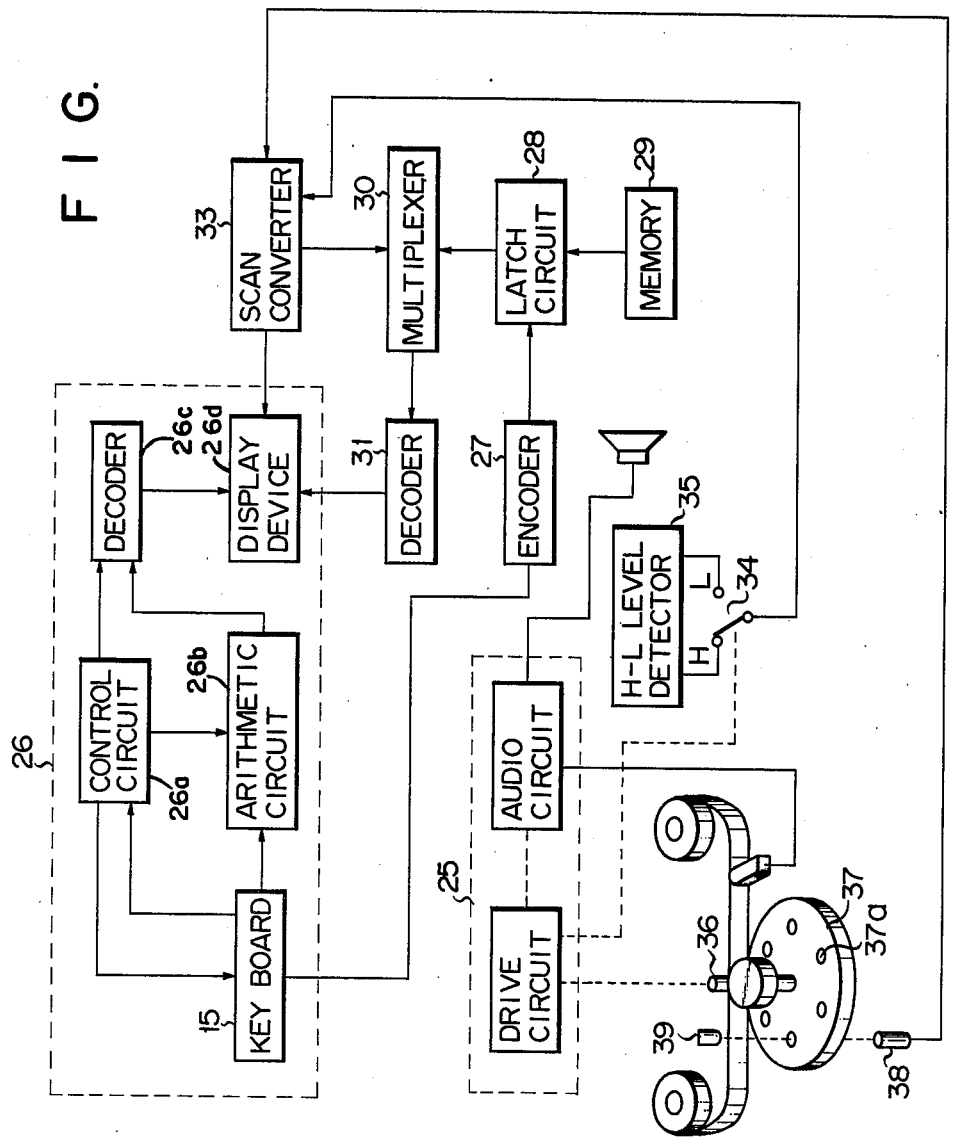

TAPE RECORDER APPARATUS WITH A TAPE-RUNNING DIRECTION DISPLAY

BACKGROUND OF THE INVENTION

This invention relates to a tape recorder apparatus, particularly a tape recorder apparatus which can display the tape-running direction.

In recent years the IC technology and LSI technology have progressed, and various electronic devices and apparatus have been made smaller. Further, multifunction electronic devices and apparatus have been invented. For example, West German Offenlegungsschrift No. 2,340,373, Feb. 20, 1975 shows a tape recorder with a micro computer (i.e. electronic desk top calculator) incorporated in it. This tape recorder apparatus is not provided with a display device which shows the tape-running data such as the tape-running direction and the tape-running speed during the recording or reproducing operation, the tape-running direction during the fast forward winding or rewinding operation and the tape-running speed. Such a display device is not indispensable to a tape recorder apparatus. But it is desirable because it helps check the tape-running and ensure a stable tape-running. In a tape recorder apparatus with an electronic desk top calculator, the display unit of the calculator can serve as such a display device as well, and the tape recorder apparatus need not be provided with another display device to display the tape-running data. Although there are known tape recorder apparatuses which can display the tape-running data, most of the tape recorder apparatus display mechanically the tape-running direction.

SUMMARY OF THE INVENTION

The object of this invention is to provide a tape recorder apparatus which can display electrically the tape-running data, at least the tape-running direction.

A tape recorder apparatus according to this invention is provided with a signal generator, a scan converter and a display device. The signal generator generates an electric signal showing the tape-running direction when a record-reproduction changeover switch or a fast forward wind-rewind changeover switch is operated. This signal is supplied to the scan converter, which generates a scan signal representative of the tape-running direction. The scan signal is supplied to the display device, which displays a light displaying numeral or mark moving in the direction corresponding to the tape-running direction.

BRIEF DESCRIPTION OF THE DRAWINGS

FIG. 4 is a block circuit diagram of another embodiment of this invention;

DETAILED DESCRIPTION OF THE PREFERRED EMBODIMENTS

Figure 1:
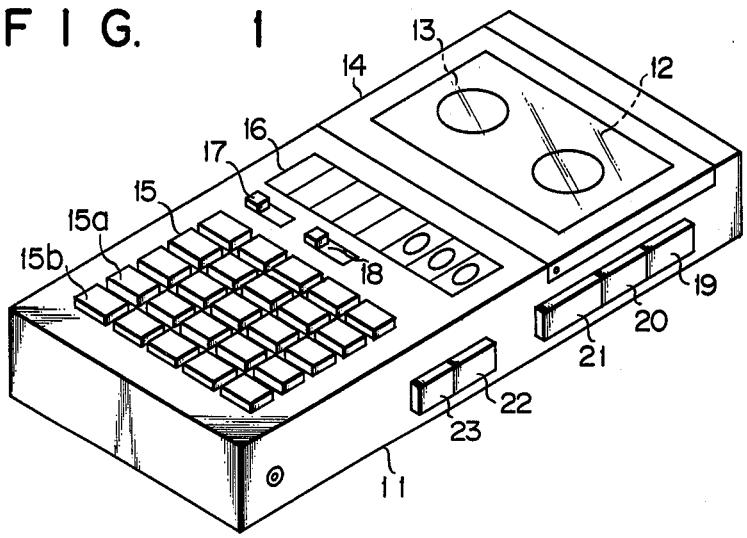
FIG. 1 is a perspective view of a tape recorder apparatus with an electronic desk top calculator, according to this invention.

The tape recorder apparatus shown in FIG. 1 is provided with an electronic desk top calculator and comprised of a case 11. In the upper front part of the case 11 there is formed a cassette receiving chamber 13, in which a cassette tape 12 is placed. A cover 14 covers the opening of the cassette receiving chamber 13 and can be opened. On the lower front part of the case 11 there is disposed a keyboard 15 of the desk top calculator. On the middle front part of the case 11 there are provided a display panel 16 constituted by, for example, light-emitting diodes, a power switch 17 and a tape-running speed changeover switch 18. On one side of the case 11 various push buttons are provided, i.e. a record button 19, a reproduction button 20, a stop button 21, a fast forward button 22 and a rewind button 23.

Figure 2:
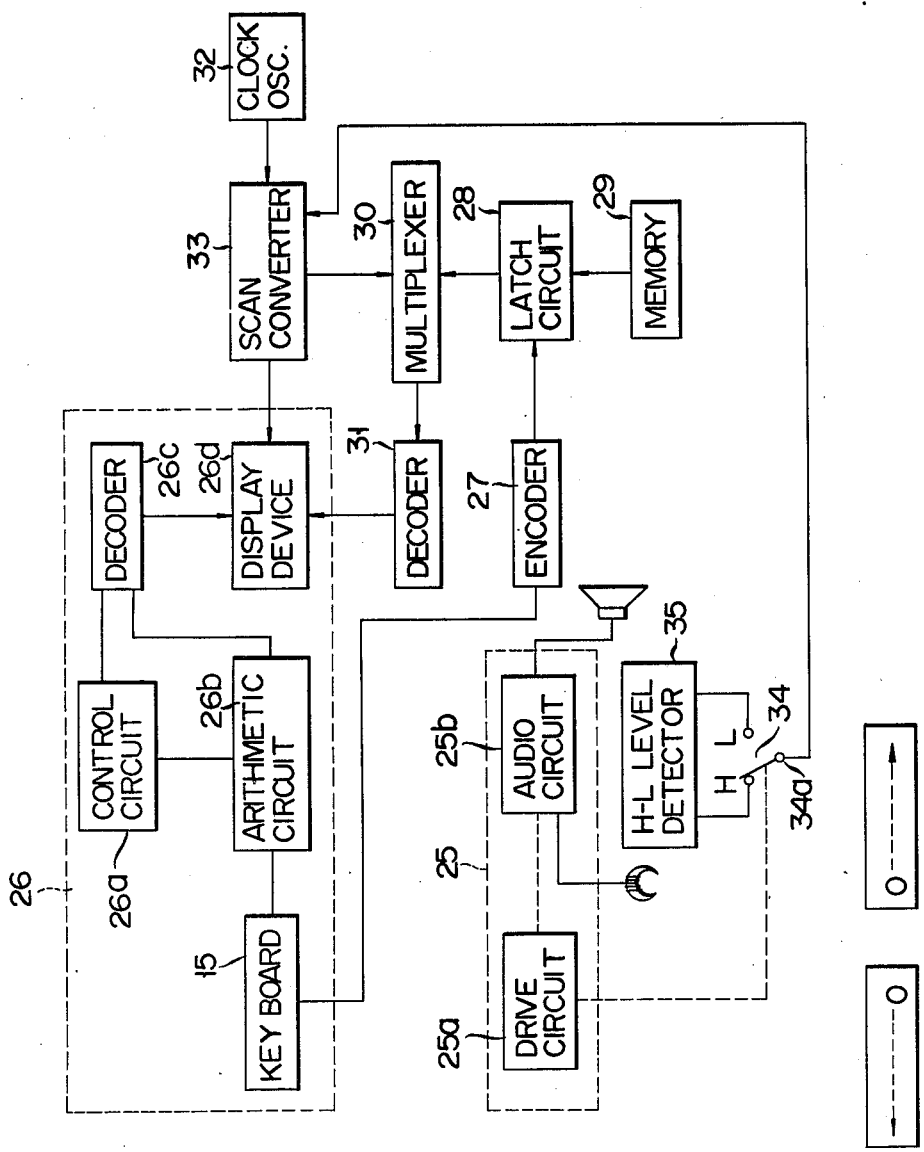
FIG. 2 is a block diagram of the tape recorder apparatus shown in FIG. 1.

With reference to FIG. 2, the circuit arrangement of the tape recorder apparatus shown in FIG. 1 will now be described.

The apparatus comprises a tape recorder unit 25 and an electronic desk top calculator unit 26. The tape recorder unit 25 includes a drive circuit 25a and an audio circuit 25b. The drive circuit 25a has a switching mechanism which effects the recording, reproducing, fast forward winding and rewinding operations, a motor, and a relay device. The audio circuit 25b amplifies a record or reproduction signal and controls the quality and volume of the sound reproduced. The desk top calculator unit 26 comprises the keyboard 15 having a plurality of keys, a control circuit 26a, an arithmetic circuit 26b, a decoder 26c and a display device 26d.

The keyboard of the calculator unit 26 is coupled through an encoder 27 to a latch circuit 28. The latch circuit 28 latches a predetermined data from a memory 29 and supplies the same to a multiplexer 30. The output of the multiplexer 30 is coupled to the display device 26d of the calculator unit 26 through a decoder 31, for example, a BCD to 7-segment decoder 31.

The display device 26d of the calculator 26 is connected to the output of a scan converter 33 which generates a scan signal in synchronism with a clock pulse from a clock pulse oscillator 32. The scan converter 33 is connected to the multiplexer 30 which is designed to supply binary coded signals to a decoder 31, so that the scan signal is synchronized with a segment signal from the decoder 31.

The switching mechanism of the tape recorder 25 includes a changeover switch 34. The switch 34 works concurrently with another changeover switch which is operated alternately by, for example, the fast forward button 22 and the rewind button 23. The common terminal 34a of the switch 34 is coupled to the scan converter 33. Thus, the switch 34 connects the scan converter 33 to the high level terminal H or low level terminal L of a high-low level detector circuit 35.

When the fast forward button 22, for instance, is depressed, the changeover switch 34 connects the scan converter 33 to, for example, the high level terminal H of the high-low level detector circuit 35. Here it is supposed that a high level signal is detected by the detector circuit 35 when the tape is wound fast from the left to the right or in the forward direction and that a low level signal is detected by the detector circuit 35 when the tape is running from the right to the left or in the backward direction. Then, a high level signal flows through the common terminal 34a of the changeover switch 34 and is supplied to the scan converter 33.

Figure 3A:
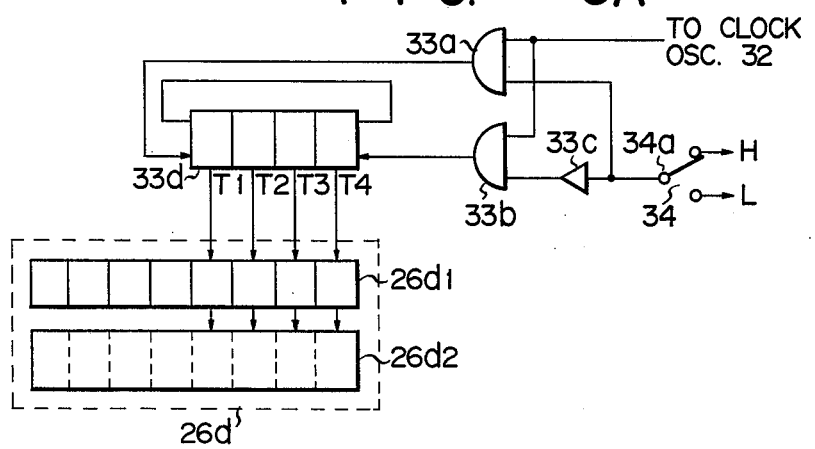
FIGS. 3A and 3B show circuit diagrams of two types of a scan converter used in the tape recorder apparatus shown in FIG. 1, respectively.

The scan converter 33 is constructed as illustrated in FIG. 3A. That is, it comprises a pair of AND gates 33a and 33b, an inverter 33c, and a ring counter 33d. The common terminal 34a of the changeover switch 34 is connected directly to one input terminal of the AND gate 33a and to one input terminal of the AND gate 33b indirectly through the inverter 33c. The outer input terminal of each AND gate is supplied with a clock pulse from the clock pulse oscillator 32. The output terminals of both AND gates 33a and 33b are connected to the ring counter 33d. Every time it receives four clock pulses from the AND gate 33a, the ring counter generates scan signals T1, T2, T3 and T4 in this order. On the other hand, every time it receives four clock pulses from the AND gate 33b, it generates scan signals T4, T3, T2 and T1 in reverse order. These scan signals are supplied to the corresponding drive sections of a drive circuit 26d1 which is provided in the display device 26d. Then the drive circuit 25d1 supplies drive signals to the corresponding display elements of a display section 26d2, each of which is constituted by seven or more light-emitting diodes (LED).

Accordingly, when the scan converter 33 receives a high level signal from the high-low level detector circuit 35 via the changeover switch 34, the AND gate 33a is opened by the high level signal. As a result, clock pulses are supplied to the ring counter 33d through the AND gate 33a. Consequently, the ring counter 33d generates scan signals T1, T2, T3 and T4 in this order, and these scan signals are supplied to the display device 26d one after another in said order.

When a specified one of the keys of the keyboard 15, for example, a key 15a, is depressed, the keyboard 15 generates a signal. This signal is encoded by the encoder 27 into a set signal, which is supplied to the latch circuit 28. In the latch circuit 28 there is latched a data, for example, "0000", from the memory 29. In response to the set signal the data "0000" is read out from the latch circuit 28 and supplied to the decoder 31 through the multiplexer 30. The decoder 31 decodes the data "0000" into segment signals, which are supplied to the display device 26d. Thus, every time it receives a scan signal, the display device 26b displays one "0" (zero). As it receives the display in turn four scan signals T1, T2, T3 and T4, the display device 26b displays "0" shifting from the highest digit position toward the second highest digit position. This means that the light spot in the form of "0" shifts from the left to the right across the display device 26b and shows that the tape is running in the forward direction.

Such a display of tape-running direction should be recognizable to human eyes. In other words, the light spot should be shifted at such a speed as to allow human eyes to recognize the direction in which the light numeral "0" moves. For this reason, it is necessary to generate scan signals at a lower frequency than in the ordinary dynamic display. To meet this demand, the oscillation frequency of the clock pulse oscillator 32 is set at a relatively low value, for instance less than 20 Hz.

As mentioned above, according to the operation of the changeover switch 34, the data "0000" is displayed as if one "0" moves from the left to the right (i.e. forward direction) or from the right to the left (i.e. backward direction), whereby the tape-running direction can be recognized. This tape-running direction need not be displayed by some 0's. Other identical numerals, 1's, 2's, ... or 9's may be used instead. Further, identical numerals need not be used. For example, "0012" indicating a tape-running speed of 1.2 m/sec or "0024" indicating a tape-running speed of 2.4 m/sec may be displayed. Such a display data can be changed to another merely by storing various data in the memory 29 and by latching any desired one of the stored data in the latch circuit 28.

In the above-described embodiment of this invention, four 0's are displayed, one at a time so that one "0" looks as if shifting in one direction or the other. Instead all the four 0's displayed at the same time may be made to disappear one after another according to the tape-running direction, whereby it looks as if a black spot moves in one direction or the other to display the actual tape-running direction. To achieve such a tape-running direction display, the level of the outputs of the ring counter 33d in the scan converter 33 may be changed properly. Moreover, eight 0's may be displayed to show the tape-running direction instead of four 0's. This can be achieved merely by increasing the stages of the ring counter 33d to eight.

Figure 3B:
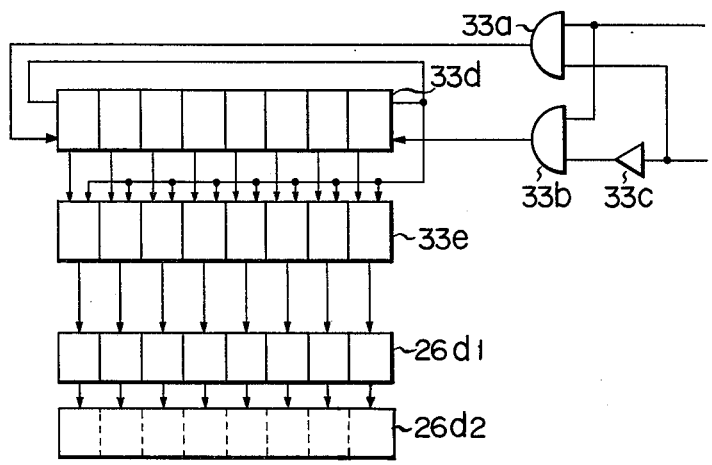

In a scan converter shown in FIG. 3B, the outputs of a ring counter 33d' are connected to corresponding hold sections of the hold circuit, for example, bistable multivibrators thereof respectively. Thus, a high level signal generated in turn from the output terminals of the ring counter is held by the hold sections of the hold circuit, the outputs of which are supplied to corresponding drive sections of the drive circuit 26d' of the display device. Further, reset terminals of the hold sections are connected to the output terminal of a final stage counter of the ring counter 33d'. According to the scan converter, scan signals supplied in turn from a plurality of stages of the ring counter 33d are held by the hold sections of the hold circuit, the outputs of which are supplied to display elements of the display device 26d2 through the drive circuit 26d1 thereof, respectively. In this way, the use of such hold circuit permits display of the display elements in turn without extinguishing the previous or preceding display. When all the display elements have been operated to display, all the hold sections of the hold circuit are reset upon receipt of an output from the final stage of the ring counter 33d', whereby all the display elements are deenergized. When an output is thereafter newly generated in turn from the output terminals of the ring counter, the same displaying operation as mentioned above is performed. If the displaying operation is conducted in the above-mentioned manner, display of "0" is made in the travelling direction of the tape without extinguishing the previous or preceding display. Note that where it is desired to cause extinguishing the the display in the travelling direction of the tape, we have only to invert the output signal of the ring counter 33d'.

In the above-mentioned embodiment the scan converter 33 generates scan signals in synchronism with clock pulses generated by the clock pulse oscillator 32. Instead, the scan convertor 33 may generate scan signals in synchronism with pulse signals which have been generated by a photoelectronic element 38 (, for example, photodiode, phototransistor or photovoltaic cell) at a frequency proportional to the rotational speed of a flywheel 37 directly connected to a capstan as illustrated in FIG. 4. In the embodiment of FIG. 4, the flywheel 37 has a plurality of through holes 37a formed in its circumferential edge and arranged at regular intervals in the circumferential direction. A light-emitting means, for example, a lamp 39 is so positioned to face the photoelectronic element 38 through one of the through holes 37a of the flywheel 37. Thus, every time the photoelectronic element 38 receives a light beam from the lamp 39 through the hole 37a, it generates a pulse. The photoelectronic element 38 generates pulse signals at a frequency proportional to the rotational speed of the flywheel, i.e. the tape-running speed. In this way, the display device 26b is driven by scan signals generated in synchronism with the pulse signal from the photoelectronic element 38, whereby the tape-running direction is displayed at a speed proportional to the tape-running speed. This achieves a more effective display of tape-running data.

Figure 5:
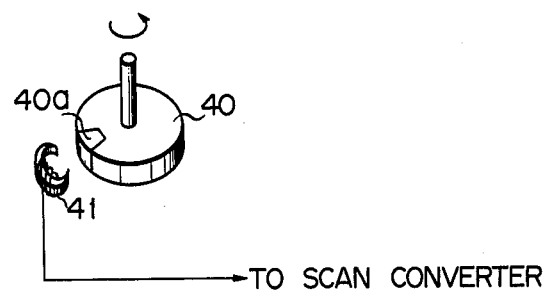
FIG. 5 shows a clock pulse oscillator means other than that used in the tape recorder apparatus shown in FIG. 4.

The pulse signals used in the embodiment of FIG. 4 to drive the scan converter 33 may be generated by a magnetic head 41 which is so positioned as to face at least one magnet 40a on the periphery of a reel table 40, as illustrated in FIG. 5. This magnetic head 41 may be replaced by a leaf switch. Then, a pulse signal will be generated in accordance with the opening and closing of the leaf switch.

Thus far described is a tape recorder apparatus with a desk top calculator, which is used as a tape recorder. To use the apparatus as a desk top calculator, the stop button 21 is depressed, and then the keys of the keyboard 15 are selectively tapped, just as to make a calculation using an ordinary desk top calculator.

Figure 6:
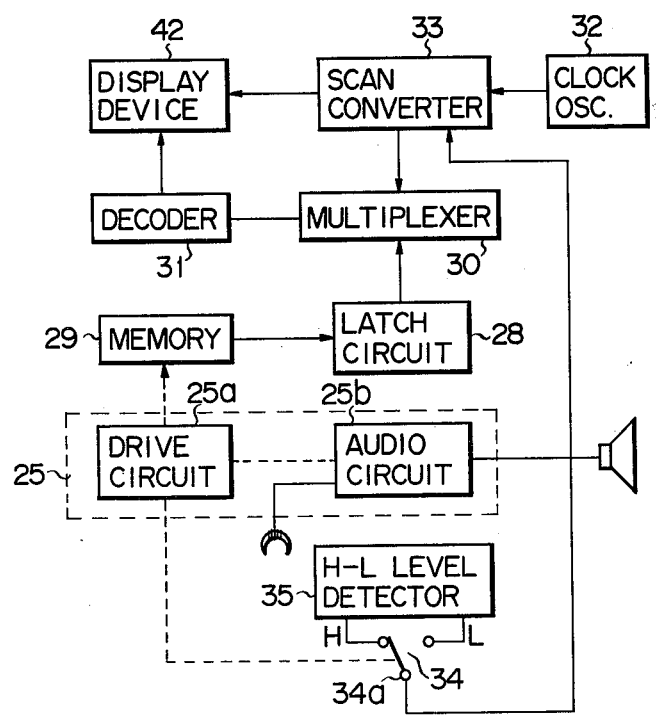
FIG. 6 is a block circuit diagram of another embodiment of this invention, not provided with an electronic desk top calculator.

All the embodiments of this invention so far described are tape recorder apparatus with a desk top calculator, wherein the tape-running direction is displayed by the display device of the calculator. But this invention is not necessarily limited to a tape recorder apparatus provided with a desk top calculator. As shown in FIG. 6, a tape recorder apparatus may be provided with a display device which is designed exclusively to show the tape-running direction. The embodiment of FIG. 6 is substantially identical with the embodiments of FIGS. 2 and 4 except that it has such a special purpose display device. Thus, its circuit arrangement is not described here.

As aforementioned, this invention makes it possible to operate a tape recorder, recognizing the tape-running direction. Thus it becomes easier to check the tape-running and thus ensure a correct tape recorder operation. Further, in a tape recorder with a desk top calculator, the display device of the calculator can serve to display the tape-running direction. Thus, the tape recorder need not be provided with another display device for displaying the tape-running direction only, and it need not be made larger. The tape recorder with a desk top calculator is therefore very useful.

What we claim is:

1. A tape recorder apparatus comprising: tape drive means for running a magnetic tape selectively in forward and backward directions; a tape-running direction detector for generating a first signal in response to the forward tape-running and a second signal in response to the backward tape-running; a pulse generator for generating a pulse signal at a low frequency; a digital display device having a plurality of digit display sections; and a display drive means connected to said pulse generator and said digital display device for driving the digit display sections sequentially in synchronism with the pulse signal of said pulse generator in a first direction corresponding to the forward tape-running direction in response to the first signal and in a second direction corresponding to the backward tape-running direction in response to the second signal.

2. A tape recorder apparatus comprising: an electronic desk top calculator unit including a keyboard having a plurality of key switches, a control circuit, an arithmetic circuit, a display device having a plurality of digit display sections; a tape recorder unit having a drive circuit including a motor to run a magnetic tape selectively in forward and backward directions and an audio circuit; a tape-running detector for generating a first signal in response to the forward tape-running and a second signal in response to the backward tape-running; a pulse generator for generating a pulse signal at a low frequency; a display drive means connected to said tape-running detector and said pulse generator for energizing the digit display sections sequentially in synchronism with the pulse signal from said pulse generator in a first direction corresponding to the forward tape-running direction in response to the first signal and in a second direction corresponding to the backward tape-running direction in response to the second signal; and a display signal generator connected to said display device for supplying to the digit display sections a display signal representing a predetermined numeral.

3. A tape recorder apparatus according to claim 2, wherein said pulse generator is constituted by a clock pulse oscillator for generating clock pulses of a low frequency.

4. A tape recorder apparatus according to claim 2, wherein said pulse generator is constituted by a flywheel driven by said motor included in said drive circuit, put in contact with a capstan and having through holes arranged at regular intervals in the circumferential direction, a light source so positioned as to face at least one of said through holes, and a photoelectronic element so disposed as to face said light source through one of said through holes and adapted to generate pulse signals at a frequency proportional to the rotational speed of said flywheel.

5. A tape recorder apparatus according to claim 2, wherein said pulse generator is constituted by a rotary member which rotates at a speed proportional to the tape-running speed, a magnet disposed on the periphery of said rotary member, and a magnetic head located adjacent said periphery and adapted to generate an output signal every time it comes to face said magnet.

6. A tape recorder apparatus according to claim 2, wherein said tape-running direction detector is constituted by a high-low level signal generator for generating a high level signal and a low level signal and a switching means for transferring to said display drive means alternatively a high level signal and a low level signal from the high-low level generator, according to the tape recorder operation.

7. A tape recorder apparatus according to claim 2, wherein said display signal generator is constituted by a numerical data generating means for generating a multi-digit numerical data in response to signals generated upon operating at least one specified key of the keyboard of said desk top calculator unit, and by a decoder for decoding the numerical data from the numerical data generating means into display signals.

8. A tape recorder apparatus according to claim 7, wherein said numerical data generating means is constituted by a means for storing a predetermined numerical data and adapted to read out the same to said decoder in response to the signals from said keyboard.

9. A tape recorder apparatus according to claim 7, wherein said numerical data generating means is constituted by a means stored with a plurality of numerical data corresponding to a plurality of tape-running speeds and adapted to read out one of said numerical data and transfer the same to said decoder in response to a figure from said keyboard.

* * * * *